US009483699B2

(12) United States Patent
Sohn et al.

(10) Patent No.: US 9,483,699 B2
(45) Date of Patent: Nov. 1, 2016

(54) APPARATUS AND METHOD FOR DETECTING TRAFFIC LANE IN REAL TIME

(71) Applicant: Industry-Academic Cooperation Foundation, Yonsei University, Seoul (KR)

(72) Inventors: Kwang-Hoon Sohn, Seoul (KR); Jong-In Son, Seoul (KR)

(73) Assignee: Industry-Academic Cooperation Foundation, Yonsei University, Seoul (KR)

(*) Notice: Subject to any disclaimer, the term of this patent is extended or adjusted under 35 U.S.C. 154(b) by 110 days.

(21) Appl. No.: 14/200,973

(22) Filed: Mar. 7, 2014

(65) Prior Publication Data

US 2014/0185879 A1    Jul. 3, 2014

Related U.S. Application Data

(63) Continuation of application No. PCT/KR2012/002015, filed on Mar. 21, 2012.

(30) Foreign Application Priority Data

Sep. 9, 2011  (KR) .................. 10-2011-0091933
Nov. 10, 2011  (KR) .................. 10-2011-0117028

(51) Int. Cl.
*G06K 9/00* (2006.01)
*G06T 7/00* (2006.01)

(52) U.S. Cl.
CPC ......... *G06K 9/00798* (2013.01); *G06T 7/0081* (2013.01); *G06T 2207/10024* (2013.01)

(58) Field of Classification Search
USPC ........................................ 382/103
See application file for complete search history.

(56) References Cited

U.S. PATENT DOCUMENTS

| | | | | |
|---|---|---|---|---|
| 2008/0273750 A1* | 11/2008 | Fujimoto | ........... | G06K 9/00362 382/103 |
| 2009/0252420 A1* | 10/2009 | Sakurai | ............... | G06K 9/4633 382/202 |
| 2012/0154588 A1* | 6/2012 | Kim | ...................... | G06K 9/4633 348/148 |
| 2012/0194677 A1* | 8/2012 | Suzuki | ............... | G06K 9/00798 348/148 |
| 2013/0242582 A1* | 9/2013 | Schofield | ............ | B60Q 1/1423 362/466 |
| 2013/0272577 A1* | 10/2013 | Sakamoto | ............. | G08G 1/167 382/103 |

FOREIGN PATENT DOCUMENTS

JP        2010044472 A   *  2/2010

* cited by examiner

*Primary Examiner* — Stephen R Koziol
*Assistant Examiner* — Delomia L Gilliard
(74) *Attorney, Agent, or Firm* — Mintz Levin Cohn Ferris Glovsky and Popeo, P.C.; Kongsik Kim; Jonathon Western

(57) ABSTRACT

An apparatus and a method for detecting traffic lanes in real time are disclosed. The disclosed real-time lane detection apparatus may include: a candidate area establisher unit configured to establish as a candidate area for lane detection an area having an intensity value which corresponds to the intensity of a traffic lane marking from among the intensity values in a color space of a color image; and a lane-marking determiner unit configured to determine a traffic lane marking from the established candidate area by using a line component of the candidate area. According to the present invention, traffic lanes can be detected accurately and quickly, even in environments where the lighting conditions of the road vary.

4 Claims, 16 Drawing Sheets

APPARATUS AND METHOD FOR DETECTING TRAFFIC LANE IN REAL TIME

CROSS-REFERENCE TO RELATED APPLICATIONS

This application is a continuation of International Application No. PCT/KR2012/002015 filed on Mar. 21, 2012, which claims priority to Korean Application No. 10-2011-0091933 filed on Sep. 9, 2011 and Korean Application No. 10-2011-0117028 filed on Nov. 10, 2011. The disclosures of the above patent applications are incorporated herein by reference in their entirety.

TECHNICAL FIELD

Embodiments of the present invention relate to an apparatus and a method for detecting traffic lanes in real time, more particularly to an apparatus and a method for detecting traffic lanes in real time with which traffic lanes can be detected accurately and quickly even in environments where the lighting conditions of the road vary.

RELATED ART

The intelligent vehicles, to which IT techniques have been incorporated, has been the focus of growing attention and hence has been the subject of active research. As a fundamental basis of intelligent vehicle technology, much research and development are especially directed towards advanced safety vehicle (ASV) technology, which involves alerting the driver with information such as lane deviations, forward/side collision risks, pedestrian collision risks, etc., in order to lower the risk of accidents.

A key technique in advanced safety vehicle (ASV) technology is to detect traffic lane markings from a color image of the road, and vision-based lane marking detection using image sensors is one of the most widely used methods.

The vision-based lane marking detection method may include the three major operations of feature extraction, outlier removal and post-processing, and lane marking tracking, where the performance and characteristics of the lane detection algorithm are determined by the algorithms used in each operation.

The features used in a vision-based lane detection method can be divided mainly into boundaries (edges) and color. However, vision-based lane detection methods that use color as the features may be very vulnerable to changes in lighting, and therefore may be difficult to apply to road environments in which there are frequent changes in lighting conditions.

That is, a road environment may include various types of lighting according to the time and location, and since such changes in lighting result in varying values for color as well, the reliability of a lane detection approach using color can be decreased.

For example, a road environment inside a tunnel or at nighttime may typically use yellow lighting from sodium lamps, so that the color of the traffic lane markings may be changed in accordance with the yellow lighting, and in cases where white lighting from fluorescent lamps or LED's are used, the color of the traffic lane markings may also be changed in accordance with the white lighting used. Likewise, the road environment in rainy weather or the road environment at dawn may each present different lighting conditions, and the color of the traffic lane markings may be changed accordingly.

On the other hand, for vision-based lane detection methods that use boundaries as the features, the clarity of images may be degraded with increased distance, to that lane detection may not be properly achieved near the vanishing point.

Various methods have been proposed to resolve these problems, such as using an image sensor capable of obtaining high-resolution data or combining different types of sensors that allow detection at long distances, but these methods may entail high implementation costs and may not be able to readily process data in real time.

SUMMARY

To resolve the problems described above, an aspect of the invention aims to provide a real-time lane detection apparatus and method that can detect traffic lanes in real time accurately and quickly, even in environments where the lighting conditions of the road vary.

To achieve the objective above, an embodiment of the invention provides a real-time lane detection apparatus that includes: a candidate area establisher unit configured to establish as a candidate area for lane detection an area having an intensity value which corresponds to the intensity of a traffic lane marking from among the intensity values in a color space of a color image; and a lane-marking determiner unit configured to determine a traffic lane marking from the established candidate area by using a line component of the candidate area.

A color space converter unit can be further included, which may be configured to convert the color space of the color image into at least one channel of the channels of a YCbCr color space.

The candidate area establisher unit can establish as the candidate area for lane detection an area having an intensity value related to the Y channel of the color space that is higher than or equal to a threshold value.

The threshold value can be a value obtained by multiplying a Y channel intensity value for a standard color of a white traffic lane marking by $n_1$% or, in cases where a multiple number of pixels forming the color image are accumulated in ascending order according to Y channel intensity values, can be a Y channel intensity value when the number of accumulated pixels exceeds the top $n_2$%.

The candidate area establisher unit can establish as the candidate area for lane detection an area having an intensity value related to the Cb channel of the color space that is lower than or equal to a threshold value.

The threshold value can be a value obtained by multiplying a Cb channel intensity value for a standard color of a yellow traffic lane marking by $m_1$% or, in cases where a multiple number of pixels forming the color image are accumulated in ascending order according to Cb channel intensity values, can be a Cb channel intensity value when the number of accumulated pixels exceeds the bottom $m_2$%.

A binary image generator unit can be further included, which may be configured to generate a binary image by using the established candidate area.

The lane-marking determiner unit can determine the traffic lane marking by using a line component in the generated binary image.

The lane-marking determiner unit can apply a Hough transform on the established candidate area and can determine the traffic lane marking in the candidate area by using multiple lines generated by the Hough transform.

The lane-marking determiner unit can determine the traffic lane marking in the candidate area by classifying the generated lines into left and right lines based on slope.

A boundary extractor unit configured to extract a boundary from the color image; and a lane-marking verifier unit configured to verify a traffic lane marking determined by the lane-marking determiner unit by using the extracted boundary, can be additionally included.

The lane-marking verifier unit can establish a search area within a particular range with respect to the determined traffic lane marking and can verify the determined traffic lane marking based on whether or not the extracted boundary exists within the established search area.

Another embodiment of the invention provides a real-time lane detection apparatus that includes: a color space converter unit configured to convert a color space of a color image into at least one channel of the channels of a YCbCr color space; and a candidate area establisher unit configured to establish as a candidate area for lane detection an area having an intensity value corresponding to the intensity of a traffic lane marking from among the intensity values in the converted color space.

Still another embodiment of the invention provides a real-time lane detection apparatus that includes: a color space converter unit configured to convert a color space of a color image into the Y channel of a YCbCr color space; and a candidate area establisher unit configured to establish as a candidate area for lane detection an area having an intensity value related to the converted Y channel that is higher than or equal to a threshold value.

Yet another embodiment of the invention provides a real-time lane detection method that includes: converting a color space of a color image into at least one channel of the channels of a YCbCr color space; and establishing as a candidate area for lane detection an area having an intensity value which corresponds to an intensity of a traffic lane marking from among intensity values in the converted color space.

According to the present invention, traffic lanes can be detected accurately and quickly, even in environments where the lighting conditions of the road vary.

Additional aspects and advantages of the present invention will be set forth in part in the description which follows, and in part will be obvious from the description, or may be learned by practice of the invention.

[Description of Reference Numerals]

Figure 1:
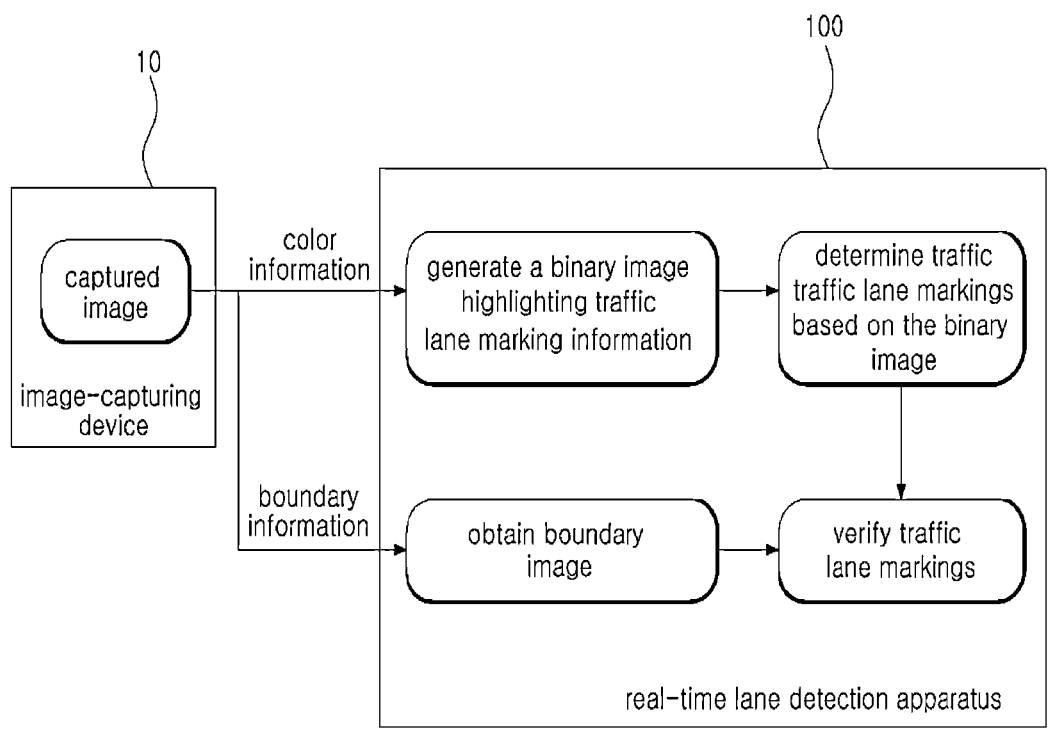
FIG. 1 schematically illustrates a process by which a real-time lane detection apparatus according to an embodiment of the invention is inputted with an image from an image-capturing device and detects traffic lanes.

| | |
|---|---|
| 10: image-capturing device | 100: real-time lane detection apparatus |
| 110: color space converter unit | 120: candidate area establisher unit |
| 130: binary image generator unit | 140: lane-marking determiner unit |
| 150: boundary extractor unit | 160: lane-marking verifier unit |
| 162: determined traffic lane markings | 164: search area |

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention will be described below in more detail with reference to the accompanying drawings.

FIG. 1 schematically illustrates a process by which a real-time lane detection apparatus 100 according to an embodiment of the invention is inputted with an image from an image-capturing device 10 and detects traffic lanes.

Referring to FIG. 1, a real-time lane detection apparatus 100 according to the present invention may employ a vision-based lane detection method, and can receive an input of a color image (hereinafter referred to as an "input image") relating to a forward view of the vehicle from an image-capturing device 10 mounted on the vehicle, and analyze the input image to detect traffic lane markings.

For convenience, the descriptions herein will be provided using an example in which it is assumed that the image-capturing device 10 is external to the real-time lane detection apparatus 100, but it is to be appreciated that the invention is not thus limited.

A real-time lane detection apparatus 100 according to the present invention may use both boundaries and color.

That is, the real-time lane detection apparatus 100 can use color to establish candidate areas, in which it is predicted that traffic lane markings are present, and thus determine the traffic lane markings, and can additionally apply boundary information to the determined traffic lane markings to verify the traffic lane markings.

To be more specific, a candidate area establisher unit 120 and a binary image generator unit 130 of the real-time lane detection apparatus 100 may analyze the color information of the input image and generate a binary image in which the traffic lane marking information is emphasized, and a lane-marking determiner unit 140 may determine traffic lane markings based on the binary image. Then, a boundary extractor unit 150 and a lane-marking verifier unit 160 may use boundary information to verify the determined traffic lane markings.

As described above, a vision-based method of lane detection using color may be sensitive to changes in lighting, i.e. changes in the light sources, and as such, a real-time lane detection apparatus 100 according to the present invention may use a YCbCr color space instead of an RGB color space for color information.

An RGB color space represents an arbitrary color as a combination of the three primary colors of red (R), green (G), and blue (B), and the pixels that form an input image may typically be expressed in an RGB color space. A YCbCr color space considers the fact that human eyes are more sensitive to light intensity than color, and represents a color based on luminance Y, blue chrominance Cb, and red chrominance Cr.

Figure 2A:
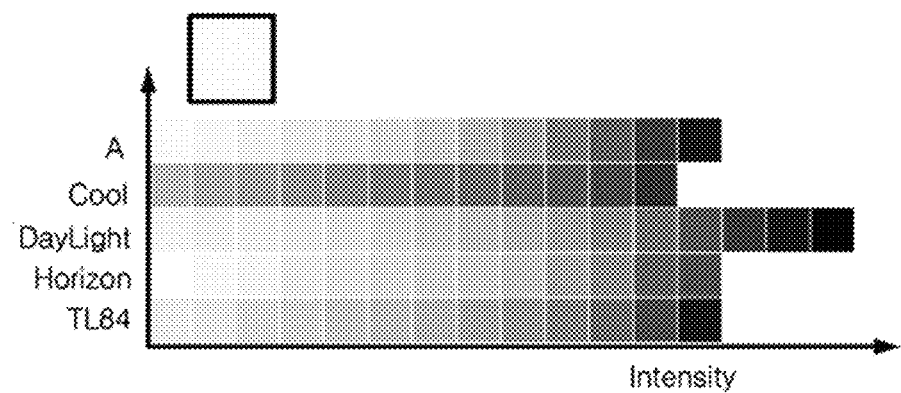
FIG. 2A illustrates color paths for a white traffic lane marking under various light sources and intensities.

That is, as illustrated in FIG. 2A, since a white traffic lane marking always displays a high intensity value compared to other colors for various light sources (A, Cool, Daylight, Horizon, TL84) and intensities, the Y channel intensity value in a YCbCr color space, i.e. the intensity, for a white traffic lane marking can be formed consistently high, unlike other colors.

Figure 2B:
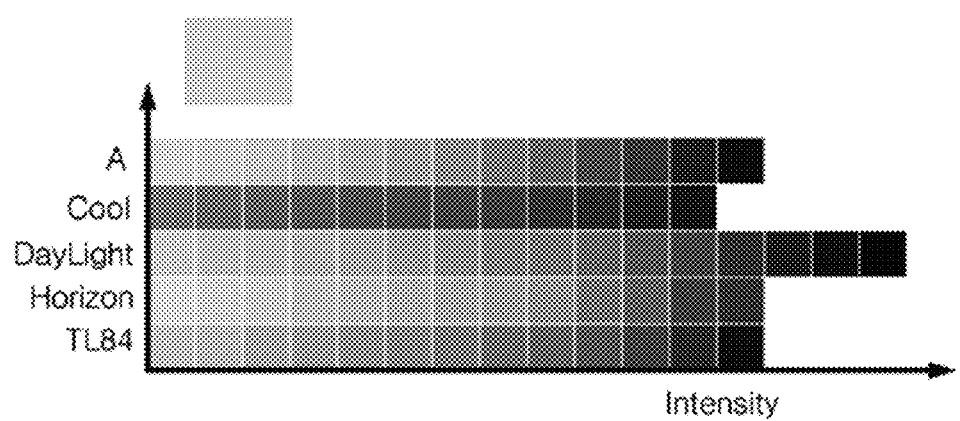
FIG. 2B illustrates color paths for a yellow traffic lane marking under various light sources and intensities.

Also, as illustrated in FIG. 2B, since a yellow traffic lane marking always displays a low blue chrominance compared to other colors for various light sources (A, Cool, Daylight, Horizon, TL84) and intensities, the Cb channel intensity value in a YCbCr color space, i.e. the intensity, for a yellow traffic lane marking can be formed consistently low, unlike other colors.

Therefore, a real-time lane detection apparatus 100 according to the present invention may use a Y channel intensity value for extracting white traffic lane markings and use a Cb channel intensity value for extracting yellow traffic lane markings in a color image.

In summary, a real-time lane detection apparatus 100 according to an embodiment of the invention can extract white traffic lane markings by taking advantage of the fact that white traffic lane markings have high Y channel intensity values, and can extract yellow traffic lane markings by taking advantage of the fact that yellow traffic lane markings have low Cb channel intensity values, to thereby detect traffic lanes accurately even in environments where the light sources may vary.

Also, in utilizing the intensity characteristics of white traffic lane markings in the Y channel and the intensity characteristics of yellow traffic lane markings in the Cb channel, a real-time lane detection apparatus 100 according to an embodiment of the invention can generally establish areas that have Y channel intensity values higher than or equal to a threshold value as candidate areas for detecting white traffic lane markings, and can generally establish areas that have Cb channel intensity values lower than or equal to a threshold value as candidate areas for detecting yellow traffic lane markings, to detect traffic lane markings more quickly.

Also, the Y channel intensity and Cb channel intensity value can be speedily obtained via a simple conversion process, to be used in detecting traffic lanes.

However, although the descriptions herein focus on an example in which the real-time lane detection apparatus 100 detects traffic lane markings by using a YCbCr color space, it would be apparent to those skilled in the art that the present invention is not thus limited and that channels of other color space schemes can also be used with which consistent values can be obtained for white and yellow traffic lane markings even in environments of changing lighting sources.

Thus, the present invention makes it possible to detect traffic lane markings accurately and quickly even in environments where the lighting conditions may vary. The real-time lane detection apparatus 100 according to the present invention will be described below in more detail with reference to FIG. 3 through FIG. 13.

Figure 3:
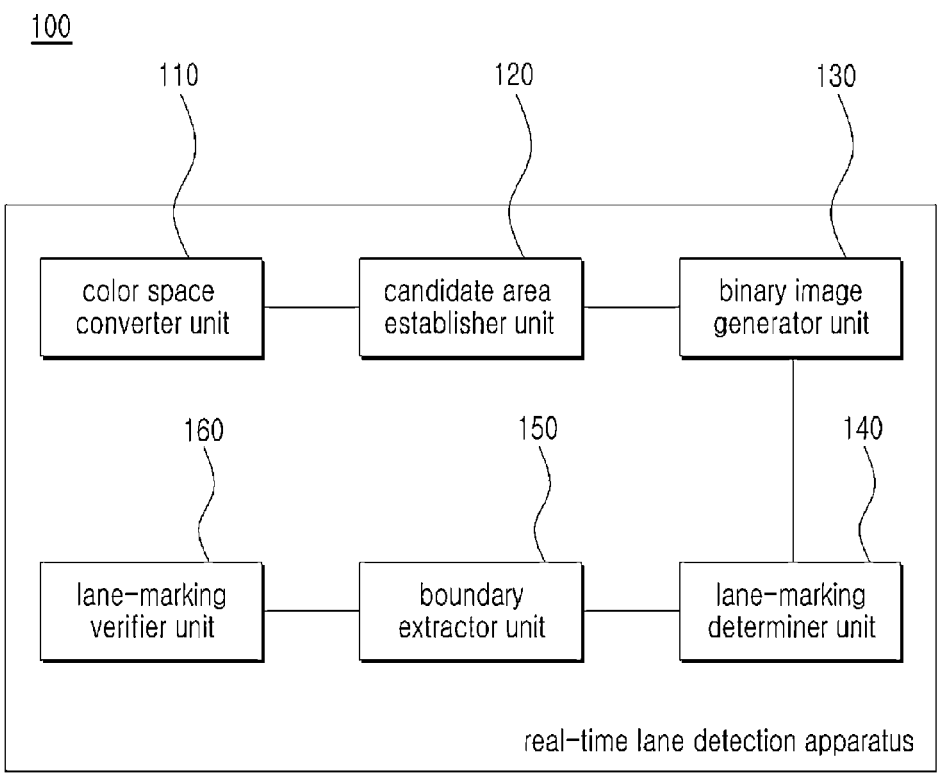
FIG. 3 illustrates the detailed composition of a real-time lane detection apparatus according to an embodiment of the invention.

FIG. 3 illustrates the detailed composition of a real-time lane detection apparatus 100 according to an embodiment of the invention.

As illustrated in FIG. 3, a real-time lane detection apparatus 100 according to an embodiment of the invention can include a color space converter unit 110, a candidate area establisher unit 120, a binary image generator unit 130, a lane-marking determiner unit 140, a boundary extractor unit 150, and a lane-marking verifier unit 160.

First, a color space converter unit 110 according to an embodiment of the invention can convert the color space for each of the multiple pixels forming an input image into at least one channel from among the channels of a YCbCr color space.

Since the pixels forming the input image may typically be represented in an RGB color space as described above, the color space converter unit 110 can convert the RGB color space into a Y channel value or a Cb channel value through the equations shown below.

$$Y=0.29900R+0.58700G+0.11400B \quad \text{[Equation 1]}$$

Here, Y is the Y channel value; R, G, and B are the respective channel values in an RGB color space; and 0.29900, 0.58700, and 0.11400 are coefficients applied to the R, G, and B channels.

$$C_b=-0.16874R-0.33126G+0.50000B \quad \text{[Equation 2]}$$

Here, Cb is the Cb channel value; and −0.16874, −0.33126, and 0.50000 are coefficients applied to the R, G, and B channels. Equation 1 and Equation 2 illustrates just one example of converting an RGB color space into a Y channel value and a Cb channel value, and various algorithms can be used for extracting channel values.

According to an embodiment of the invention, the Y channel value can have a value of 0 to 255 according to Equation 1, and as Y is a value related to the average intensity of RGB, the Y channel value can be used unmodified as the Y channel intensity value at the candidate area establisher unit 120 described below.

The Cb channel value can have a value of −127.5 to 127.5 according to Equation 2, and as Cb is a value related to blue chrominance, the Cb channel value can be used after adding 127.5, to yield a value of 0 to 255, for it to be used as the Cb channel intensity value at the candidate area establisher unit 120 described below.

Figure 4A:
FIG. 4A illustrates an input image according to an embodiment of the invention.
Figure 4B:
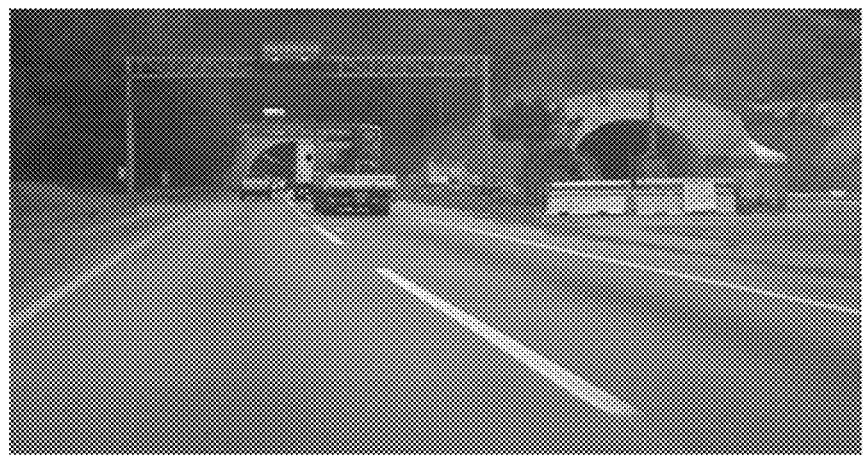
FIG. 4B illustrates an image generated with Y channel values converted by a color space converter unit according to an embodiment of the invention.
Figure 4C:
FIG. 4C illustrates an image generated with Cb channel values converted by a color space converter unit according to an embodiment of the invention.

FIG. 4A, FIG. 4B, and FIG. 4C illustrate an input image and images generated with channel values converted by a color space converter unit 110 according to an embodiment of the invention, where FIG. 4A illustrates the input image, FIG. 4B illustrates an image generated with Y channel values, and FIG. 4C illustrates an image generated with Cb channel values.

According to another embodiment of the invention, the color space conversion by the color space converter unit 110 may correspond to a data processing procedure and can also be performed by the candidate area establisher unit 120 described below. That is, the candidate area establisher unit 120 can convert the color space of an input image into at least one of the YCbCr channels and can establish a candidate area for detecting traffic lane markings, as described below.

The candidate area establisher unit 120 according to the present invention may establish an area, which has a value corresponding to the intensity of a traffic lane marking from among the intensity values related to a channel converted by the color space converter unit 110, as a candidate area for detecting traffic lane markings.

To be more specific, a candidate area establisher unit 120 according to an embodiment of the invention can establish an area having values higher than or equal to a threshold value from among the Y channel intensity values in a YCbCr color space for an input image, as a candidate area for detecting white traffic lane markings.

That is, in correspondence to the fact that the Y channel intensity value is always high for a white traffic lane marking, the candidate area establisher unit 120 may establish as a candidate area an area having values higher than or equal to a threshold value from among the Y channel intensity values for an input image, so that the candidate area thus established can be used in detecting white traffic lane markings.

Here, the threshold value may represent a Y channel intensity value by which a white traffic lane marking can be distinguished from another color and, in an embodiment of the invention, can be determined relatively from the intensity values of an input image.

Since a white traffic lane marking is shown relatively brightly in a bright input image and is shown relatively brightly in a dark input image, the threshold value may be determined relatively from the intensity values of an input image in an environment having varying lighting sources.

A candidate area establisher unit 120 according to an embodiment of the invention can determine the threshold value relatively according to the input image by using the number of pixels accumulated according to Y channel intensity value.

That is, supposing that the pixels forming an input image are accumulated in ascending order according to Y channel intensity values, the candidate area establisher unit 120 may choose the threshold value as the Y channel intensity value when the number of accumulated pixels exceeds the top n %, and may establish a candidate area as an area having values that are higher than or equal to the threshold value.

For instance, the candidate area establisher unit 120 can establish, as a candidate area for detecting white traffic lane markings, an area having values higher than or equal to the Y channel intensity value when the accumulated number of pixels exceeds the top 5%, from among the Y channel intensity values for an input image.

Figure 5:
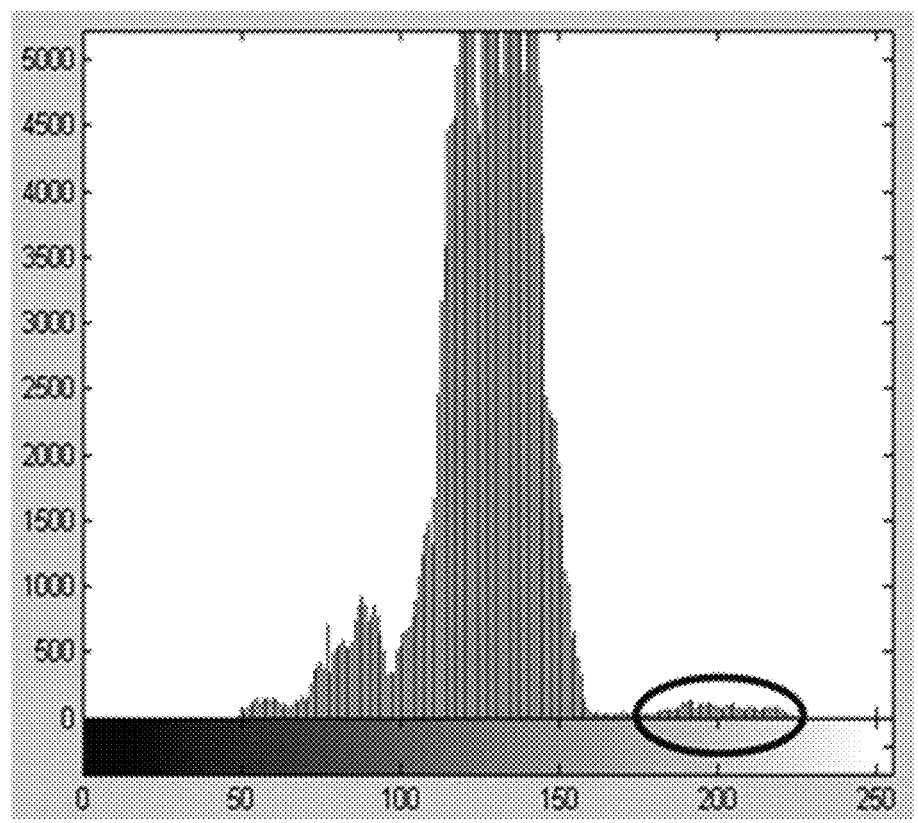
FIG. 5 illustrates an area having intensity values that are higher than or equal to the Y channel intensity value when the number of accumulated pixels exceeds the top 5%, according to an embodiment of the invention.

In FIG. 5, the horizontal axis represents the Y channel intensity values, while the vertical axis represents the number of pixels for the Y channel intensity values, and the area marked with a circle shows the area having values higher than or equal to the Y channel intensity value when the accumulated number of pixels exceeds the top 5%, according to an embodiment of the invention.

As illustrated in FIG. 5, an area having values higher than or equal to the Y channel intensity value when the number of accumulated pixels exceeds the top 5% is an area having Y channel intensity values that are distinguishable from other colors and at the same time is also an area that is determined relatively according to the intensity values of the input image. As such, when the candidate area is thus established according to an embodiment of the invention, it is possible to accurately detect white traffic lane markings even with various changes in lighting conditions.

Furthermore, since the areas having Y channel intensity values higher than or equal to the threshold value, as illustrated in FIG. 5, all correspond to candidate areas for detecting white traffic lane markings, there are no additional computations necessary in establishing the candidate areas for traffic lane detection, and the white traffic lane markings can be detected more quickly according to the present invention.

In another embodiment of the invention, the threshold value can also be set absolutely from the standard color for a white traffic lane marking, in order to simplify the procedures for detecting traffic lane markings.

That is, in a driving environment where the change in light sources is expected to be constant, the threshold value can be set beforehand from the Y channel intensity value related to the standard color of a white traffic lane marking, and the areas having Y channel intensity values higher than or equal to the preset threshold value can be established as the candidate areas, so that the detection of white traffic lane markings can be performed more quickly.

For instance, the threshold value can be set to 204, which corresponds to 80% of the Y channel value of 255 relating to the standard color sRGB(255, 255, 255) of a white traffic lane marking, and areas having Y channel intensity values higher than or equal to 204 can be immediately established as candidate areas.

Continuing with the description, a candidate area establisher unit 120 according to an embodiment of the invention can establish an area having values lower than or equal to a threshold value from among the Cb channel intensity values in a YCbCr color space for an input image, as a candidate area for detecting yellow traffic lane markings.

Figure 6:
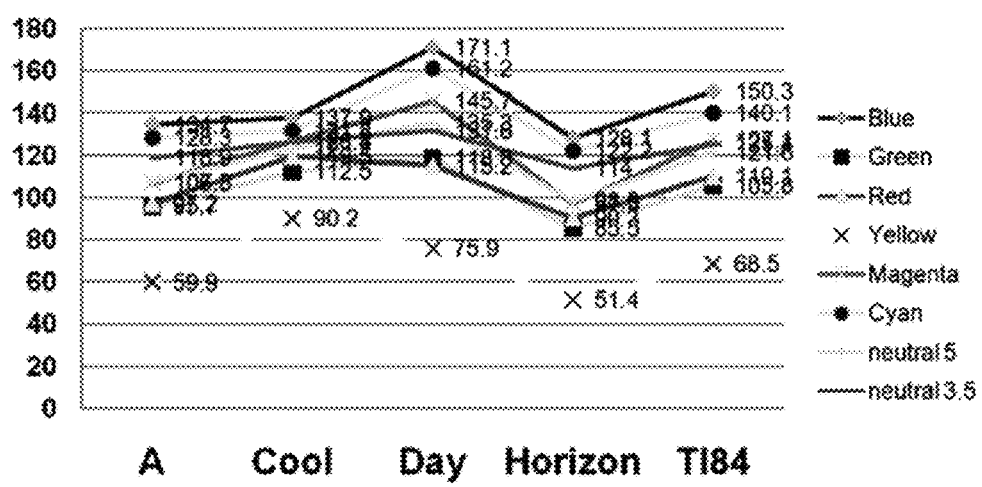
FIG. 6 illustrates the intensity characteristics of a yellow color compared to other colors.

That is, in correspondence to the fact that the Cb channel intensity value is always low for a yellow traffic lane marking as shown in FIG. 6, the candidate area establisher unit 120 may establish as a candidate area an area having values lower than or equal to a threshold value from among the Cb channel intensity values for an input image, so that the candidate area thus established can be used in detecting yellow traffic lane markings.

Similarly to the descriptions provided above, the threshold value here may represent a Cb channel intensity value by which a yellow traffic lane marking can be distinguished from another color and, in an embodiment of the invention, can be determined relatively from the intensity values of an input image. For this, the candidate area establisher unit 120 may use the number of pixels accumulated according to Cb channel intensity value.

That is, supposing that the pixels forming an input image are accumulated in ascending order according to Cb channel intensity values, a candidate area establisher unit 120 according to an embodiment of the invention may choose the threshold value as the Cb channel intensity value when the number of accumulated pixels exceeds the bottom m %, and may establish a candidate area as an area having values that are lower than or equal to the threshold value.

For instance, the candidate area establisher unit 120 can establish, as a candidate area for detecting yellow traffic lane markings, an area having values lower than or equal to the Cb channel intensity value when the accumulated number of pixels exceeds the bottom 3%, from among the Cb channel intensity values for an input image.

Figure 7:
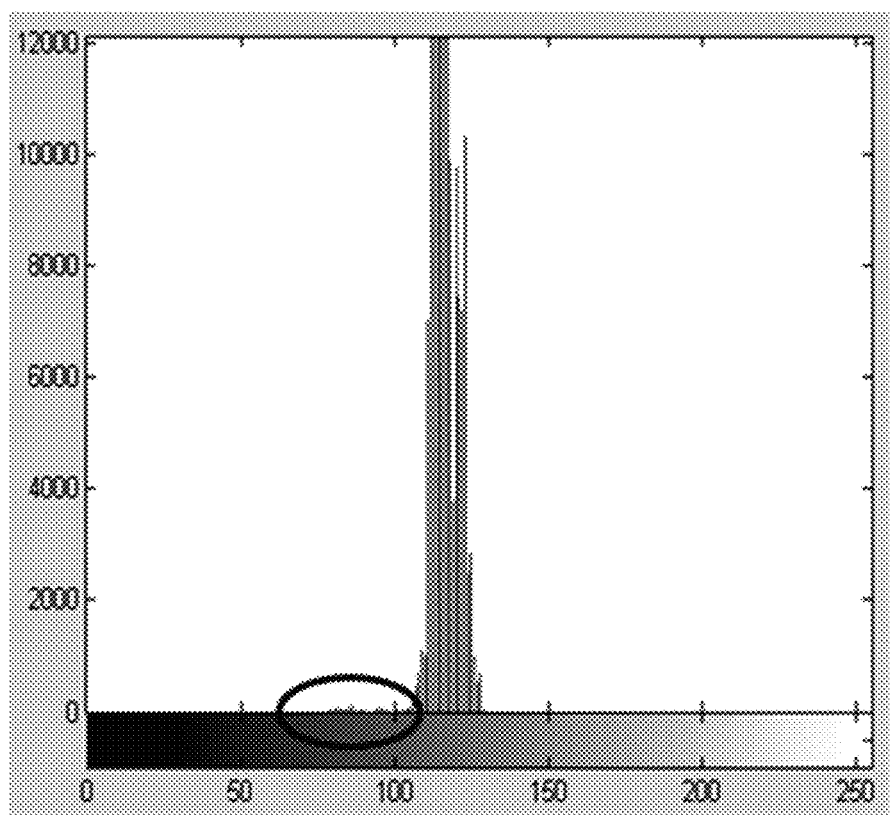
FIG. 7 illustrates an area having intensity values that are lower than or equal to the Cb channel intensity value when the number of accumulated pixels exceeds the bottom 3%, according to an embodiment of the invention.

In FIG. 7, the horizontal axis represents the Cb channel intensity values, while the vertical axis represents the number of pixels for the Cb channel intensity values, and the area marked with a circle shows the area having values lower than or equal to the Cb channel intensity value when the accumulated number of pixels exceeds the bottom 3%, according to an embodiment of the invention.

As illustrated in FIG. 7, an area having values lower than or equal to the Cb channel intensity value when the number of accumulated pixels exceeds the bottom 3% is an area having Cb channel intensity values that are distinguishable from other colors and at the same time is also an area that is determined relatively according to the intensity values of the input image. As such, when the candidate area is thus established according to an embodiment of the invention, it is possible to accurately detect yellow traffic lane markings even with various changes in lighting conditions.

Also, similar to the case of detecting white traffic lane markings, since the areas having Cb channel intensity values lower than or equal to the threshold value all correspond to candidate areas for detecting yellow traffic lane markings, the candidate areas for lane detection can be established quickly, and as a result, the detection of yellow traffic lane markings can be performed more quickly.

Also, according to another embodiment of the invention, the threshold value can also be set absolutely from the standard color for a yellow traffic lane marking; for instance, the threshold value can be set to 23, which corresponds to 80% of the Cb channel value of 29 relating to the standard color sRGB(254, 193, 16) of a yellow traffic lane marking, and areas having Cb channel intensity values lower than or equal to 23 can be immediately established as candidate areas.

Although the number of accumulated pixels are set to the top 5% and the bottom 3%, respectively, in the descriptions above for convenience, it would be apparent to those skilled in the art that these are merely examples and that other numbers can be used for more accurate lane detection, such as the top 3% and the bottom 1%, for example.

Also, although the descriptions above assume that an input image includes both white traffic lane markings and yellow traffic lane markings, in another embodiment of the invention, the input image can include only white traffic lane markings. In such cases also, the candidate area establisher unit 120 can set candidate areas for detecting white traffic lane markings as well as candidate areas for detecting yellow traffic lane markings.

Next, the binary image generator unit 130 according to an embodiment of the invention can generate a binary image using the candidate areas established by the candidate area establisher unit 120.

To be more specific, the binary image generator unit 130 can generate a binary image in which the pixels that form candidate areas established by the candidate area establisher unit 120 are expressed by 1 and the pixels that form other areas are expressed by 0.

That is, the binary image generator unit 130 according to an embodiment of the invention can generate a binary image for detecting white traffic lane markings by setting those pixels that have Y channel intensity values higher than or equal to a threshold value to 1 and setting the remaining pixels to 0, from among the pixels that form the input image.

Also, the binary image generator unit 130 according to an embodiment of the invention can generate a binary image for detecting yellow traffic lane markings by setting those pixels that have Cb channel intensity values lower than or equal to a threshold value to 1 and setting the remaining pixels to 0, from among the pixels that form the input image.

The binary image generator unit 130 according to an embodiment of the invention can combine the binarized images generated as above into a single binary image, and thus allow the lane-marking determiner unit 140, which will be described below in more detail, to determine a left traffic lane marking and a right traffic lane marking with respect to a vehicle.

In other words, by way of the binary image generator unit 130, the candidate areas for white traffic lane markings and the candidate areas for yellow traffic lane markings, which relate to intensity properties of different channels, can be combined into one image, and as a result, the traffic lane markings on the left and right of a vehicle can be determined and utilized as information for the driving of the vehicle.

Figure 8A:
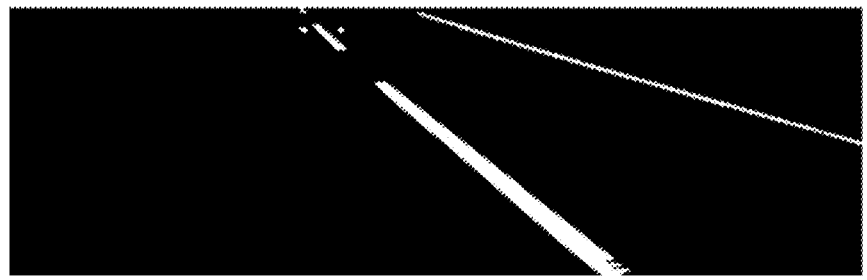
FIG. 8A illustrates a candidate area for detecting white traffic lane markings binarized by a binary image generator unit according to an embodiment of the invention.
Figure 8B:
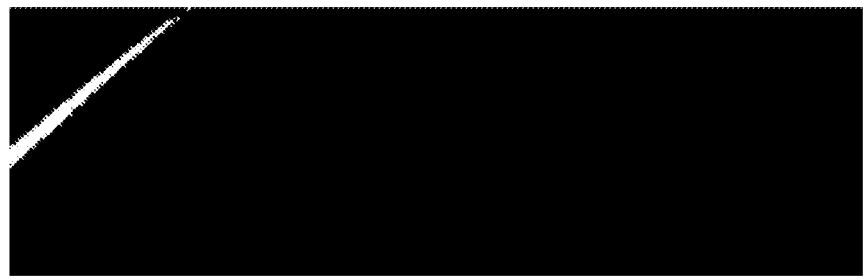
FIG. 8B illustrates a candidate area for detecting yellow traffic lane markings binarized by a binary image generator unit according to an embodiment of the invention.
Figure 8C:
FIG. 8C illustrates a binary image obtained by combining the binarized images of FIG. 8A and FIG. 8B according to an embodiment of the invention.

FIG. 8A, FIG. 8B, and FIG. 8C illustrate binary images generated by a binary image generator unit 130 according to an embodiment of the invention. FIG. 8A shows an image in which candidate areas for detecting white traffic lane markings are binarized, FIG. 8B shows an image in which candidate areas for detecting yellow traffic lane markings are binarized, and FIG. 8C shows an image in which the binary image of FIG. 8A and the binary image of FIG. 8B are combined, as a prerequisite for determining traffic lanes.

As illustrated in FIG. 8C, a binary image generator unit 130 of the present invention can generate one binary image, incorporating the candidate areas for white traffic lane markings and candidate areas for yellow traffic lane markings, which relate to intensity properties in different channels.

Continuing with the description, a lane-marking determiner unit 140 according to an embodiment of the invention can extract line components in the candidate areas established by the candidate area establisher unit 120, to determine the traffic lane markings.

As described above, the candidate areas here may be generated as a binarized image by the binary image generator unit 130, and therefore the lane-marking determiner unit 140 according to the present invention may extract line components from the binarized image to determine the traffic lane markings.

First, the lane-marking determiner unit 140 according to an embodiment of the invention can utilize a Hough transform for the extraction of line components.

The Hough transform is an algorithm for finding a line that satisfies a particular condition from among a set of arbitrary points on a plane. The particular condition can be that, if a certain number or more of points exist in an arbitrary line, then the area in which the points exist is to be determined as a line.

Figure 9A:
FIG. 9A illustrates a binary image generated by a binary image generator unit according to an embodiment of the invention.
Figure 9B:
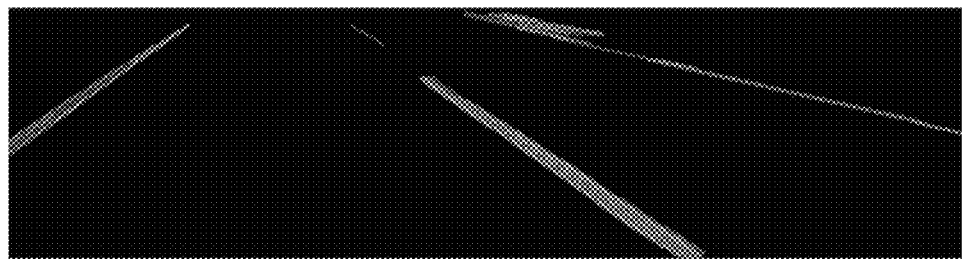
FIG. 9B illustrates the results of applying a Hough transform on a binary image according to an embodiment of the invention.

FIG. 9A and FIG. 9B illustrate the results of applying a Hough transform on a binary image according to an embodiment of the invention. As shown in FIG. 9A and FIG. 9B, the areas of interest of the binary image can be expressed as a multiple number of lines by way of the Hough transform.

Next, the lane-marking determiner unit 140 according to an embodiment of the invention may analyze the multiple lines transformed by the Hough transform, to exclude those candidate areas that do not exhibit the properties of traffic lane markings from the procedure for determining traffic lane markings, and at the same time, to determine the traffic lane markings on the left and right of the vehicle as driving information.

To be more specific, the lane-marking determiner unit 140 may classify the multiple transformed lines into left and right lines, group the multiple left and right classified lines into areas, and determine the areas having the most lines from among the grouped areas as traffic lane markings.

For this, the multiple lines transformed by the Hough transform may first be classified by the lane-marking determiner unit 140 into left and right lines based on slope.

Figure 10:
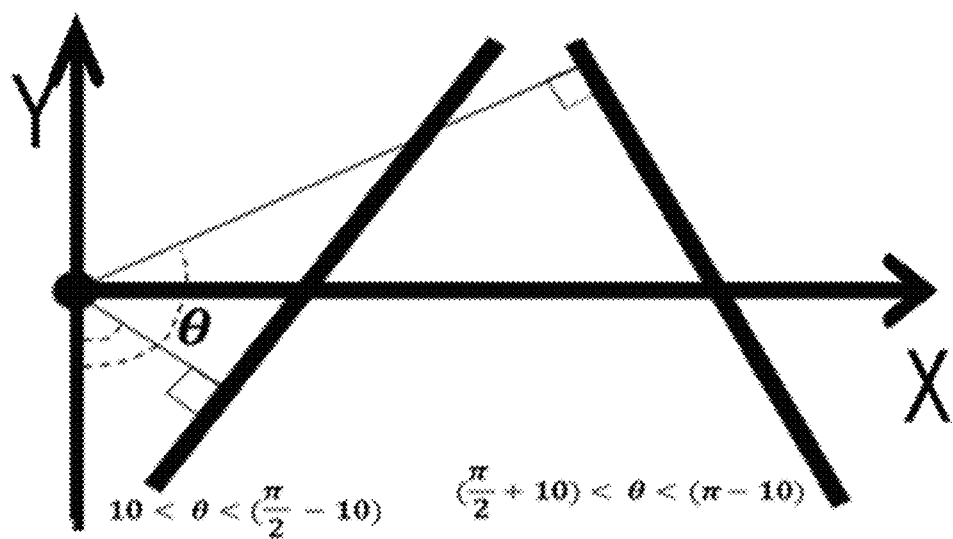
FIG. 10 illustrates a process by which a lane-marking determiner unit according to an embodiment of the invention classifies a multiple number of lines into left and right lines by using their slopes.

For example, the lane-marking determiner unit 140 may apply an x and a y coordinate axes over the image of FIG. 9B, as illustrated in FIG. 10, and by using the angle formed between the y-axis and a normal line extending from the origin of the coordinate axes to each of the multiple lines, can classify the multiple lines into left and right lines.

For instance, if the angle θ between the normal line and the y-axis is $10°<θ<80°$, then the line can be classified as being present on the left of the vehicle, and if the angle is $100°<θ<170°$, then the can be classified as being present on the right of the vehicle.

Figure 11A:
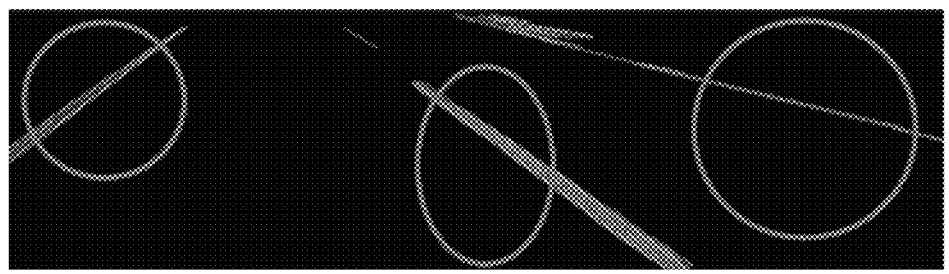
FIG. 11A illustrates a process by which a lane-marking determiner unit according to an embodiment of the invention groups the left and right lines.

Next, the lane-marking determiner unit 140 may group the left and right classified lines into areas based on slope and the starting point on the x-axis, and according to an embodiment of the invention, as illustrated in FIG. 11A, can group the left lines into one area and the rights lines into two areas.

Figure 11B:
FIG. 11B illustrates the traffic lane markings determined by a lane-marking determiner unit according to an embodiment of the invention.

Lastly, the lane-marking determiner unit 140 may determine traffic lane markings as the areas that include the most lines from the grouped areas. According to an embodiment of the invention, as illustrated in FIG. 11B, the left lines belong to one group, which can therefore be determined as a traffic lane marking immediately, while the right lines belong to two groups, among which the area having more lines can be determined as a traffic lane marking.

In this way, a lane-marking determiner unit 140 according to an embodiment of the invention can determine traffic lane markings, to be provided as driving information, from candidate areas or binary images containing information related to traffic lane markings, while areas that do not exhibit the properties of traffic lane markings can be excluded from the procedures for determining traffic lane markings.

For instance, according to another embodiment of the invention, the candidate area establisher unit 120 can establish candidate areas from areas having the intensity value characteristics of yellow traffic lane markings even in an input image that includes only white traffic lane markings. Such areas would be excluded by the lane-marking determiner unit 140 from the procedures for detecting traffic lane markings.

Although the descriptions above are provided with the assumption that a lane-marking determiner unit 140 according to an embodiment of the invention uses a Hough transform as the algorithm for extracting line components, the invention is not thus limited, and the lane-marking determiner unit 140 can use various algorithms for extracting the line components.

Also, according to an embodiment of the invention, the traffic lane markings determined by the lane-marking determiner unit 140 can be used directly as resources for detecting traffic lane markings in an arbitrary input image, and the detection of traffic lane markings by the boundary extractor unit 150 and lane-marking verifier unit 160 described below may correspond to procedures for verifying that the determining of traffic lane markings from the candidate areas has been performed properly.

For convenience, a description of the lane-marking verifier unit 160 will be provided before a description of the boundary extractor unit 150.

A lane-marking verifier unit 160 according to an embodiment of the invention can establish a search area within a particular range with respect to the traffic lane markings determined by the lane-marking determiner unit 140, and can verify the traffic lane markings by using the boundaries present within the search area.

To be more specific, the lane-marking verifier unit 160 may establish a search area within a range of 10 to 20 pixels to the left and right with respect to a traffic lane marking determined by the lane-marking determiner unit 140, and may decide whether or not a boundary is present within the search area, to thereby verify the validity of the determined traffic lane marking. Here, the lane-marking verifier unit 160 can additionally use slopes and x-intercept of the boundaries and the determined traffic lane markings.

In one example, if there is no boundary present within a search area, the lane-marking verifier unit 160 can treat the traffic lane marking determined by the lane-marking determiner unit 140 as being invalid, but if there is a boundary present within the search area, it can treat the traffic lane marking determined by the lane-marking determiner unit 140 as being valid.

Even when there is a boundary present within a search area, the lane-marking determiner unit 140 can treat the determined traffic lane marking as being invalid if there is a large difference between the slope of the determined traffic lane marking and the slope of the boundary.

Also, if only a portion of a boundary is within the search area, the determined traffic lane marking can be treated as being valid if the slope and x-intercept of the determined traffic lane marking is within a certain tolerance range from those of the boundary.

Here, the 10 to 20 pixels is merely an example, and the search area can be established with a narrower range to improve the accuracy of the traffic lane detection.

The boundaries can be extracted by a boundary extractor unit 150 according to an embodiment of the invention, where the boundary extractor unit 150 can utilize an algorithm for extracting boundaries from an input image, such as Canny edge detection for example.

Figure 12:
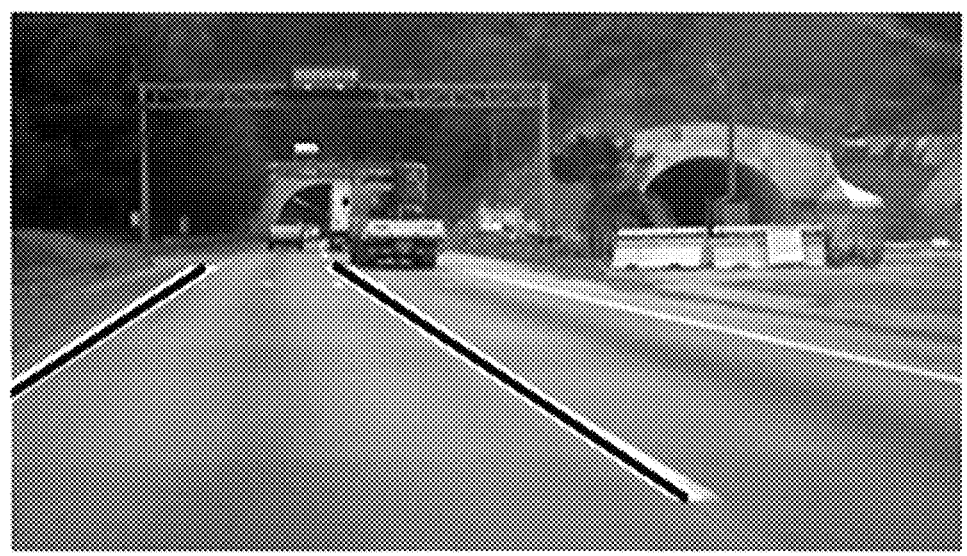
FIG. 12 illustrates a search area established with respect to the determined traffic lane markings according to an embodiment of the invention.

FIG. 12 illustrates search areas 164 established with respect to the determined traffic lane markings 162 according to an embodiment of the invention.

Figure 13A:
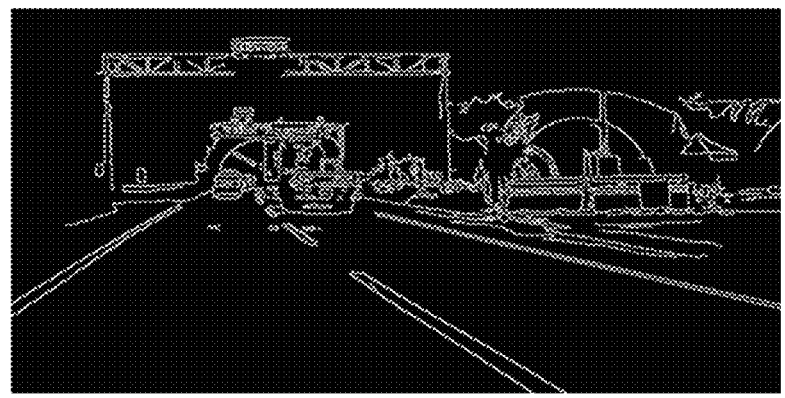
FIG. 13A illustrates an image related to boundaries extracted by a boundary extractor unit according to an embodiment of the invention.
Figure 13B:
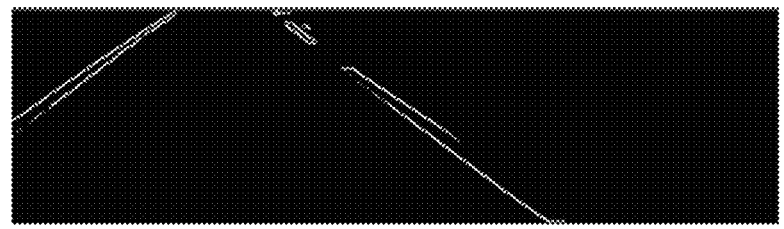
FIG. 13B illustrates boundaries present within a search area according to an embodiment of the invention.

Also, FIG. 13A illustrates an image of the boundaries extracted by a boundary extractor unit 150 according to an embodiment of the invention, and FIG. 13B illustrates the boundaries that exist within the search areas 164 according to an embodiment of the invention.

As illustrated in FIG. 13A and FIG. 13B, a traffic lane marking 162 that was determined by the lane-marking determiner unit 140 may be treated as being valid by the lane-marking verifier unit 160, if there are boundaries present within the search area 164.

According to another embodiment of the invention, the lane-marking verifier unit 160 can remove boundaries that exist outside the search areas 164 from the boundary image, and can combine boundaries present in the search areas 164 into one line, so as to provide additional information for the detection of traffic lanes.

That is, according to another embodiment of the invention, the detection of traffic lane markings can be performed from average values of boundaries present within the search areas 164.

In this way, a real-time lane detection apparatus 100 according to the present invention can accurately detect traffic lane markings compared to other vision-based traffic lane detection apparatuses, even in environments where the light sources may vary.

Also, a real-time lane detection apparatus 100 according to the present invention can detect traffic lane markings more quickly, by establishing those areas having intensity values higher than or equal to a threshold value and those areas having intensity values lower than or equal to a threshold value directly as traffic lane candidate areas, as described above, and the acquiring of intensity values from the process for color space conversion can also be processed quickly for use in detecting traffic lane markings.

Figure 14:
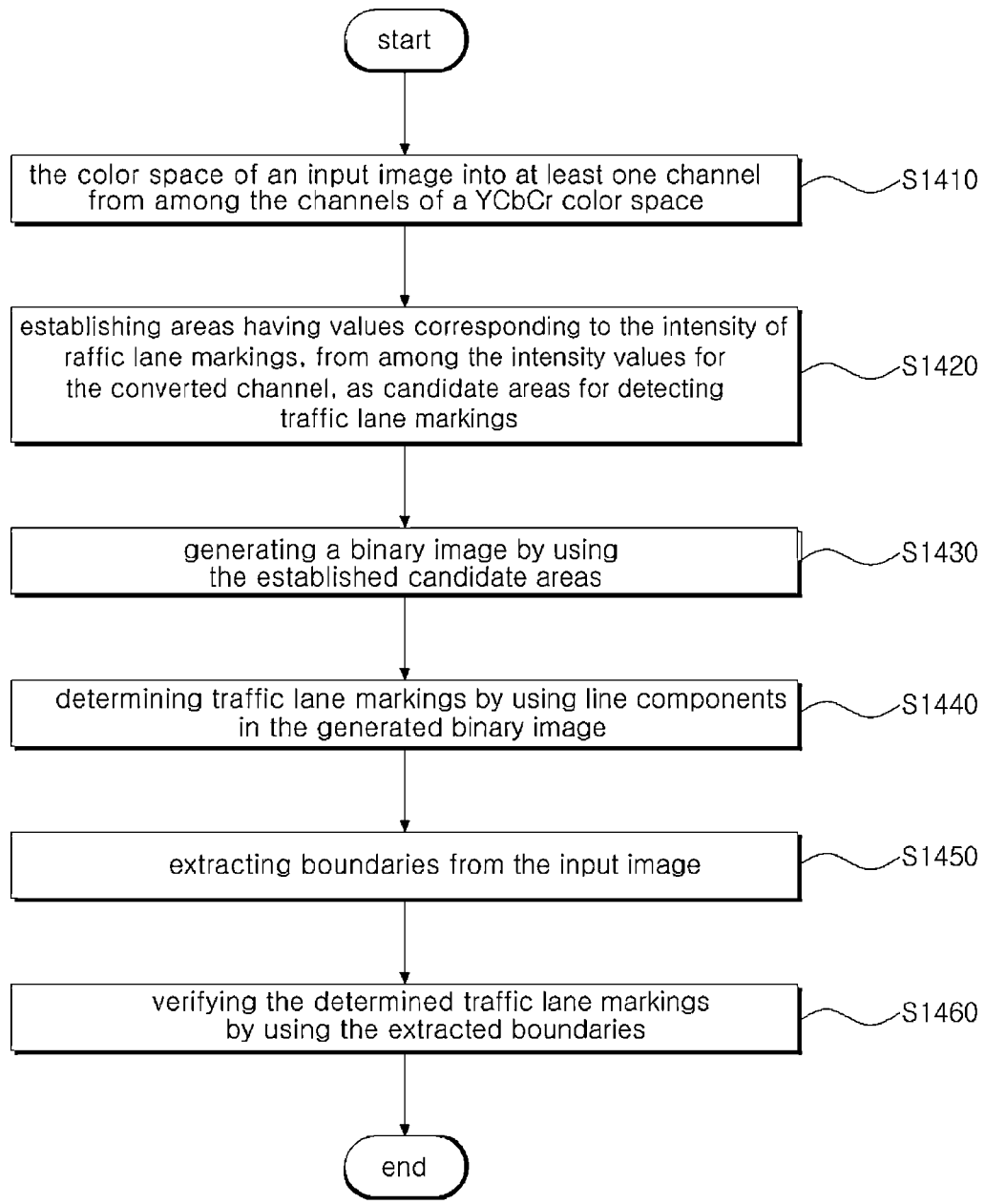
FIG. 14 is a flowchart illustrating a method of detecting traffic lanes in real time according to an embodiment of the invention.

FIG. 14 is a flowchart illustrating a method of detecting traffic lanes in real time according to an embodiment of the invention.

As illustrated in FIG. 14, a real-time traffic lane detection method according to an embodiment of the invention can include converting the color space (S1410), establishing candidate areas (S1420), generating a binary image (S1430), determining traffic lane markings (S1440), extracting boundaries (S1450) and verifying the traffic lane markings (S1460).

First, in the operation of converting the color space (S1410), the color space of an input image can be converted to at least one channel from among the channels of a YCbCr color space.

According to an embodiment of the invention, the operation (S1410) can include converting an RGB color space of an input image into Y channel values and Cb channel values. Here, the Y channel values can be used unchanged in the operation (S1420) as Y channel intensity values, while the Cb channel values can be used after adding 127.5, so as to yield values from 0 to 255.

Next, in the operation of establishing candidate areas (S1420), areas having values corresponding to the intensity of traffic lane markings, from among the intensity values relating to the channel converted in the operation (S1410), can be established as candidate areas for detecting traffic lane markings.

To be more specific, the operation (S1420) according to an embodiment of the invention can establish areas having values higher than or equal to a threshold value, from among the Y channel intensity values of the input image, as candidate areas for detecting white traffic lane markings, so that the established areas may be used in detecting white traffic lane markings.

Here, the threshold value may represent a Y channel intensity value by which a white traffic lane marking can be distinguished from another color, and can be determined relatively from the intensity values of the input image.

Also, the operation (S1420) according to an embodiment of the invention can establish areas having values lower than or equal to a threshold value, from among the Cb channel intensity values of the input image, as candidate areas for detecting yellow traffic lane markings, so that the established areas may be used in detecting yellow traffic lane markings.

Similarly, the threshold value may represent a Cb channel intensity value by which a yellow traffic lane marking can be distinguished from another color, and can be determined relatively from the intensity values of the input image.

Continuing with the description, in the operation of generating a binary image (S1430), a binarized image may be generated using the candidate areas established in the operation (S1420).

To be more specific, the operation (S1430) according to an embodiment of the invention can generate a binary image in which the pixels that form candidate areas established in the operation (S1420) are expressed by 1 and the pixels that form other areas are expressed by 0.

That is, the operation (S1430) according to an embodiment of the invention can generate a binary image for detecting white traffic lane markings by setting those pixels that have Y channel intensity values higher than or equal to a threshold value to 1 and setting the remaining pixels to 0, from among the pixels that form the input image.

Also, the operation (S1430) according to an embodiment of the invention can generate a binary image for detecting yellow traffic lane markings by setting those pixels that have Cb channel intensity values lower than or equal to a threshold value to 1 and setting the remaining pixels to 0, from among the pixels that form the input image.

In the operation (S1430) according to an embodiment of the invention, the binary images generated as above can be combined into one binary image, so that the candidate areas for white traffic lane markings and the candidate areas for yellow traffic lane markings, which relate to intensity properties of different channels, can be combined into a single image, and thus allowing the determining of the left and right traffic lane markings with respect to the vehicle in the operation (S164) described below.

The operation of determining traffic lane markings (S1440) can determine the traffic lane markings by using line components in the binary image generated in the operation (S1430).

Here, the operation (S1440) according to an embodiment of the invention can use a Hough transform for the extraction of the line components.

Also, in the operation (S1440), the multiple lines transformed by the Hough transform can be analyzed, so that candidate areas that do not exhibit the properties of traffic lane markings may be excluded from the procedure for determining traffic lane markings, and so that the traffic lane markings on the left and right of the vehicle may be determined as driving information.

In other words, the multiple transformed lines may be classified into left and right lines, the multiple left and right classified lines may be grouped into areas, and the areas having the most lines from among the grouped areas may be determined as traffic lane markings.

Lastly, in the operation of extracting boundaries (S1450), boundaries may be extracted from the input image, and in the operation of verifying the traffic lane markings (S1460), the traffic lane markings of the input image can be verified by using the boundaries extracted in the operation (S1450) and the traffic lane markings determined in the operation (S1440).

Certain embodiments of a real-time lane detection method according to the present invention have been described above, and the features of the real-time lane detection apparatus 100 described with reference to FIG. 1 through FIG. 13 can also be applied to these embodiments. As such, more detailed descriptions will be omitted.

The embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A real-time lane detection apparatus having a processor that controls operation of the real-time lane detection apparatus, the apparatus comprising:
the processor which is configured to operate as:
a color space converter unit converting a color space of a color image into at least one channel of channels of a YCbCr color space; and
a candidate area establisher unit establishing as a candidate area for yellow and white lane detection an area having an intensity value corresponding to an intensity of a traffic lane marking from among intensity values in the converted color space, establishing as the candidate area for white lane detection an area having an intensity value related to the converted Y channel that is higher than or equal to a first threshold value, and establishing as the candidate area for yellow lane detection an area having an intensity value related to the converted Cb channel that is lower than or equal to a second threshold value,
wherein the second threshold value is a value obtained by multiplying a Cb channel intensity value for a standard color of a yellow traffic lane marking by m1% or, in a case where a plurality of pixels forming the color image are accumulated in ascending order according to Cb channel intensity values, is a Cb channel intensity value when a number of the accumulated pixels exceeds a bottom m2%.

2. The real-time lane detection apparatus of claim 1, wherein the first threshold value is a value obtained by multiplying a Y channel intensity value for a standard color of a white traffic lane marking by $n_1$% or, in a case where a plurality of pixels forming the color image are accumulated in ascending order according to Y channel intensity values, is a Y channel intensity value when a number of the accumulated pixels exceeds a top $n_2$%.

3. A real-time lane detection method comprising:
converting a color space of a color image into at least one channel of channels of a YCbCr color space;
establishing as a candidate area for yellow and white lane detection an area having an intensity value corresponding to an intensity of a traffic lane marking from among intensity values in the converted color space;
establishing as the candidate area for white lane detection an area having an intensity value related to the converted Y channel that is higher than or equal to a first threshold value; and
establishing as the candidate area for yellow lane detection an area having an intensity value related to the converted Cb channel that is lower than or equal to a second threshold value,
wherein the second threshold value is a value obtained by multiplying a Cb channel intensity value for a standard color of a yellow traffic lane marking by m1% or, in a case where a plurality of pixels forming the color image are accumulated in ascending order according to Cb channel intensity values, is a Cb channel intensity value when a number of the accumulated pixels exceeds a bottom m2%.

4. The real-time lane detection method of claim 3, wherein the first threshold value is a value obtained by multiplying a Y channel intensity value for a standard color of a white traffic lane marking by $n_1$% or, in a case where a plurality of pixels forming the color image are accumulated in ascending order according to Y channel intensity values, is a Y channel intensity value when a number of the accumulated pixels exceeds a top $n_2$%.

* * * * *